United States Patent [19]

Forestek

[11] 4,051,275
[45] Sept. 27, 1977

[54] EMBEDDING AND COMPACTING PARTICLES IN POROUS SURFACES

[76] Inventor: Clarence W. Forestek, c/o The Forester Plating & Manufacturing Co. 9607 Quincy Ave., Cleveland, Ohio 44106

[21] Appl. No.: 663,458

[22] Filed: Mar. 3, 1976

Related U.S. Application Data

[63] Continuation-in-part of Ser. No. 481,703, June 21, 1974, abandoned.

[51] Int. Cl.$^2$ ............................................. B05D 1/38
[52] U.S. Cl. .................................. 427/201; 427/180; 427/202; 427/205; 427/318; 427/319; 427/348; 427/349; 427/369; 427/374 B; 427/398 D; 428/306; 428/309; 428/422
[58] Field of Search ............... 427/355, 201, 202, 203, 427/204, 205, 180, 348, 349, 369; 428/306, 422, 309

[56] References Cited

U.S. PATENT DOCUMENTS

| 706,701 | 8/1902 | Thurston | 427/180 |
|---|---|---|---|
| 2,387,872 | 10/1945 | Bell | 427/242 |
| 2,723,204 | 11/1955 | Pottberg et al. | 427/192 |
| 2,990,293 | 6/1961 | Toulmin, Jr. | 427/29 |
| 3,066,042 | 11/1962 | Ogden | 427/327 |
| 3,211,325 | 10/1965 | Wisnicki | 220/64 |
| 3,279,936 | 10/1966 | Forestek | 428/327 |
| 3,287,157 | 11/1966 | Brown, Jr. et al. | 427/345 |
| 3,754,976 | 8/1973 | Babecki et al. | 427/192 |

Primary Examiner—Ronald H. Smith
Assistant Examiner—Evan K. Lawrence
Attorney, Agent, or Firm—Walter J. Monacelli

[57] ABSTRACT

The process described herein involves a method of compacting and increasing the amount of particles, such as polytetrafluoroethylene, etc., deposited in fissures in a surface which involves heating the surface to expand the size of the fissures or pores in the surface, then depositing in the expanded fissures finely divided particles at a temperature at least 100° F, preferably at least 300° F below the temperature of the surface, and subsequently permitting the temperature of the surface and of the particles to come to equilibrium whereby the particles are locked into the fissures by interference fit. The surface is then subjected to a blasting fluid stream carrying finely divided particles applied at a pressure of 30–120 psi, preferably 40–80 psi, to compact the particles in the fissures, after which the original treatment is repeated by heating the surface, depositing additional finely divided particles at a temperature at least 100° F below the temperature of the surface so that the additional particles are also locked into the fissures. The blasting operation and subsequent treatment to lock additional particles in the fissures improves markedly the useful life of the treated surface.

16 Claims, No Drawings

EMBEDDING AND COMPACTING PARTICLES IN POROUS SURFACES

CROSS-REFERENCE TO RELATED APPLICATIONS

This application is a continuation-in-part of application Ser. No. 481,703 filed June 21, 1974, now abandoned.

BACKGROUND OF THE INVENTION

1. Field of the Invention:

This invention relates to a method of treating surfaces having pores or fissures. More specifically it relates to an improved method of locking finely deposited particles, such as polytetrafluoroethylene, into the pores or fissures in a surface. Still more specifically it is related to an improved method of compacting said deposited particles in said fissures and then depositing or locking an additional amount of the finely divided particles in said fissures.

2. Related Prior Art:

U.S. Pat. Nos. 3,279,936 and 3,502,493 disclose and cover the process of depositing finely divided particles into the fissures or pores of a surface while the surface is at a raised temperature so that the fissures are in an enlarged or expanded condition and the particles are at a temperature at least 150° F, preferably at least 300° F below the temperature of the heated surface. After the particles are deposited in the fissures the temperature of the surface and of the particles is permitted to come to equilibrium with the result that the particles are locked into the fissures by interference fit. These particles, particularly when they are polytetrafluoroethylene, impart desirable properties, such as reduced friction and antisticking properties, to the treated surface.

Metal surfaces so treated have been used for many purposes such as metal stamping, drawing and forming, plastic extrusion, fabrication and sealing, rubber molding, etc. While the useful life of the metal articles used for these purposes has been extended tremendously by the treatment described in the above patents, it is found that eventually the repeated pressure of materials under the high working pressures used for these purposes causes some compaction of the locked particles into the fissures so that there is some space in the fissures into which debris such as lubricants or the material being compressed may become lodged in the fissures and interferes with the function of the embedded particles. It is desirable therefore that the possibility of this compaction and deposition of debris in the fissures should be reduced or avoided.

SUMMARY OF THE INVENTION

In accordance with the practice of this invention it has been found possible to extend remarkably the useful life of surfaces produced by the above-described process of embedding finely divided particles in fissures of a surface, by compacting the embedded particles either immediately after the initial preparation of the surface or after it has been in use for some time, and then repeating the process of locking finely divided particles into the space in the fissures made available by compaction of the previously inserted particles. This compaction is effected by blasting onto the surface a fluid stream having finely divided particles suspended therein. The blasting stream may be air, or other gaseous fluid, an aqueous suspension of the particles, or a combination of air and such an aqueous suspension.

DESCRIPTION OF THE PREFERRED EMBODIMENTS

While the particles used in the blasting stream may be different from those embedded in the fissures, it is generally desirable for several reasons that they are of the same type. First since some of them may become lodged permanently in the fissures it is desirable to have these of the same type, particularly where contamination is of concern such as where the ultimate surface is to be in contact with food. Secondly, since the blasting particles produce the best results in compaction when they are of about the same hardness as that of the previously embedded particles, selection of the same type for this purpose assures the desired effect. If particles of a lower hardness are used they are less efficient in producing the compaction and may become adhered or impaled on the embedded particles. Particles of a greater hardness, while effective in producing the desired compaction, are, if too hard, more likely to abrade or erode the surface which contains the fissures and would therefore be objectionable. Moreover the weight of the particles is also important in the energy imparted for compaction. For example, with heavy particles the required energy may be delivered with a pressure as low as 20 psi, whereas with very light particles a pressure as high as 150 psi or higher may be necessary.

When the particles being impinged by the air blast are of such a hardness that they tend to abrade or erode the surface, then softer particles may be used even though they are less efficient and may require a more prolonged period of blasting or higher pressure (or velocity) to effect the desired amount of compaction. In such cases particles are selected that will permit subsequent removal from the fissures, preferably by solution, or decomposition to vaporous materials, such as soluble salts, organic polymers, walnut shells, etc.

The period of blasting will vary according to the particular particles being blasted, the pressure at which the particles are being blasted, the size and weight of the particles, the size of the fissures, etc. However a very short period of blasting produces a noticeable effect in the lasting properties of the ultimate product as compared to a product given only the single treatment described in the above-mentioned patents. It appears that the compacting effect is greatest in the first few second of blasting. For example a blasting of 3–10 seconds at 60 psi on a fixed area produces a noticeable improvement in the ultimate product. Optimum blasting periods are determined by the operator in accordance with the size and contour of the surface being blasted, the size of the blasting nozzle and cross-section of the blasting stream, the pressure of the blasting stream, etc. While continued blasting may give further compacting, the rate of compacting decreases with time since the more compacted the particles have become the more diminished are the results achieved with continued blasting. Generally, however, the blasting should not be continued to a point beyond that producing a slight change in the appearance of the surface. Beyond this point there may be an undesired amount of abrasion or erosion.

While it is generally preferred that the temperature of the article on whose surface the particles are being embedded should be brought to approximately room temperature before the blasting operation is performed, primarily for ease in handling, it is also possible to initiate the blasting operation while the article is still at a temperature considerably above room temperature. This may be convenient where it is desired to save time in the overall operation. In any case the temperature of the article is decreased to room temperature or possibly even below room temperature by the cooling effect of the blasting stream directed onto the surface of the article.

Moreover while the temperature of the blasting stream is not critical, except that it should not be of such a high temperature as to soften the blasting particles, it is generally most convenient to use a stream of approximately room temperature or ambient temperature under the conditions being used. Generally as the blasting stream escapes from the directing nozzle there is a cooling effect which may reduce the temperature of the stream to below room temperature. This is not critical in the operation of this invention.

The invention is particularly applicable to the embedding of perfluorocarbon polymers, such as polytetrafluoroethylene, in fissures of various types of surfaces, particularly metal surfaces, as described in U.S. Pat. No. 3,279,936. However it is also useful in the embedding of elemental metal and metal compound particles as described in U.S. Pat. No. 3,502,493.

As used herein, the term perfluorocarbon is defined as (a) polytetrafluoroethylene, (b) mixtures of polytetrafluoroethylene and polymonochlorotrifluoroethylene, (c) polymonochlorotrifluoroethylene, (d) copolymers of tetrafluoroethylene with hexafluoropropylene, (e) mixtures of polytetrafluoroethylene and polyhexafluoropropylene and (f) equivalents thereof. Of the foregoing plastics, (a) and (b) are highly preferred. In particular, polymeric materials (a) and (b) are insoluble, heat-resistant and resistant to chemical attack. In addition, these materials slide on themselves and on metals with the lowest static coefficients of friction of any solids, polymer (a) being 0.04 and polymer (b) being 0.05 respectively compared to 0.09 for graphite, as well as possessing many chemical properties far superior to graphite.

By perfluorocarbon is included that class of polymers characterized by an absence of hydrogen atoms, and a preponderance of fluorine atoms in which there are at least three fluorine atoms for each other halogen atom (such as chlorine). Also included are polymers which have resistance to high temperatures, lubricity, chemical inertness and coefficients of expansion which are substantially equivalent to polytetrafluoroethylene for the intended use. Other particles that may be embedded in fissures in accordance with the practice of this invention include graphite and molybdenum disulfide, for their excellent lubricating properties, and various elemental metals are metal compounds including titanium, zirconium, molybdenum, hafnium, selenium, antimony, barium oxide, barium carbide, beryllium, beryllium oxide, boron nitride, cerium, chromium, cobalt, copper, graphite, hafnium, hafnium carbide, iridium, manganese, molybdenum disulfide, nickel, platinum, rhodium, selenium, silicon carbide, tantalum, titanium, tungsten, tungsten carbide and vanadium. The average size of the particles should be 0.05 to 50, and preferably 0.5 to 30 microns. The particle size should be such that the unexpanded particles will enter or can be forced into the fissures in the surface. Theoretically, it is contemplated that the particle size can be correlated with the size of the width of the fissures so that there are from one to perhaps five particles across the width of each fissure.

The size of the pores or fissures in the surface is preferably of about the same order as the particles and in any case should not exceed an average size of 100 microns.

As indicated above the blasting fluid may be an air stream in which the particles are suspended, or a stream of an aqueous suspension of the particles or a combination of air and such an aqueous suspension. When air is used without the aqueous suspension, the particles may be suspended in a chamber in which a number of air jets are used in the bottom of the chamber to keep a sufficient amount of the particles suspended in the air. A hose may be used to conduct the air stream from this chamber to the nozzle used for directing the blast onto the subject surface. Instead, if desired, the particles may be fed from a vibrating hopper directly into a stationary nozzle with the subject piece being moved in front of the nozzle.

Generally it is preferred to move the nozzle relative to the piece so that a considerable area is treated simultaneously, preferably the whole piece, with the number of passes in front of the nozzle being sufficient to produce the desired result.

The time of blasting for a fixed area is calculated roughly as the time required for blasting the total area times the ratio of the cross-section of the blasting stream to the toal area. For example, if the blasting stream has a cross-section of 2 sq. in. at the point where the blast hits the piece, with the total area being 60 sq. in. and the total blasting time being 3 minutes, the blasting time for a fixed area is calculated as 3 minutes × 2/60 or 0.1 minute, e.g. six seconds. The cross-sectional area of the stream at the point where the blast hits the piece is referred to herein as the fixed area.

The aqueous suspension that may be applied directly as the fluid stream, or in combination with an air stream, is maintained in a vessel provided with air agitation, or other means such as a propellor type agitator. The suspension is then pumped to the nozzle through which the suspension is to be blasted in accordance with this invention. When the aqueous stream is to be blasted as such directly onto the surface, the entire vessel may be placed under the pressure necessary to deliver the suspension through the nozzle at the desired pressures. Or, if preferred, the suspension may be pumped by a centrifugal, reciprocating or other type of pump to the nozzle at the desired pressure. The pressures cited herein for the purpose of this invention are the pressures measured at the entrance to the blasting nozzle.

When the aqueous suspension is to be delivered with an air blast, the suspension may be pumped by any suitable means to the nozzle. The nozzle may be of various designs available commercially where a liquid is fed to the nozzle and an air stream also fed to the nozzle picks up the liquid through a venturi feed or by aspirator effect to deliver the liquid to the air stream emanating from the nozzle. The pressures cited for the purpose of this invention are the air pressures measured at the air inlet to the nozzle.

Where the particles are difficult to wet, the water used for the suspension may contain a small amount of wetting agent to aid in the wetting and suspension of the particles. The amount of wetting agent is desirably kept at a minimum in order to reduce foaming that might be caused by the agitation of the suspension. To minimize or avoid foaming, an antifoaming agent may be used. The amounts of wetting agent, where used, that will be suitable depends on a number of factors including the type, size and amount of the particles being used, the hardness of the particular water used, the particular wetting agent itself, etc. Likewise the amount of antifoaming agent, where used, will depend on the type and amount of wetting agent used, the hardness of the water, the type and amount of agitation, etc. However appropriate amounts of each may be easily determined by simple experimentation once the type and size of particles and other operating conditions are determined. By simple incremental addition of small amounts under operating conditions of pressure and agitation until the appropriate wetting is achieved, the amount of wetting agent is easily determined. If with this amount of wetting agent there is an undesirable amount of foaming a desirable amount of antifoaming agent can likewise be determined by small incremental additions until the desired effect is achieved.

While there are any number of various types of wetting agents commercially available for this purpose, one found particularly suitable for wetting perfluorocarbon polymers, such as polytetrafluoroethylene is the sodium alkylbenzene sulfonate type with the alkyl representing 5–15 carbon atoms. The nonylbenzene sulfonate is a typical example. These are available commercially under the trademark Santomerse as well as under other trademarks. However, any number of other materials giving equivalent wetting properties are available.

Likewise, there are any number of antifoaming agents available commercially that may be used where necessary to reduce foaming in the practice of this invention. One found to be suitable is a solution made up of a hydrocarbon available under the trademark Dipentene 122 (300 parts by volume) and 30 parts by volume of Dow Corning Antifoam A. There are any number of other materials available which give equivalent antifoaming effect.

As indicated above appropriate amounts of wetting agent and antifoaming agent are determined by very simple experimentation. Typical amounts of Santomerse No. 1 for improving wetting are about ¼ to 1 ounce of the commercial material per gallon of water and, of the antifoaming solution mentioned above, about 6–10 cc per gallon of water gives the desired effect.

In preparing the suspension, generally about 10–30 ounces, preferably about 15–25 ounces of the particles are used per gallon. While all of the particles may not be in suspension at the same time, the remaining particles either floating on the surface of the water or sinking to the bottom depending on the density, more is added to the suspension by the agitation as depletion proceeds by the blasting operation. Periodically more of aqueous medium and of the particles are added as the supply in the suspension vessel runs low.

After the surface has been blasted with the stream in which the particles are suspended, a blast of clean oil-free air at 80–120 psi is used to remove loose particles from the surface and the fissure openings. Then the procedure of reheating and depositing additional particles in the fissures is repeated as described above.

Prior to the blasting step described herein, the surface, generally a metallic surface, is treated to provide a plurality of minute interstices, pores, cavities or fissures on or in the metal surface. This is accomplished, for instance, (a) by mechanical treatment or pretreatment such as liquid-honing or sand blasting, (b) by forming an integral phosphate coating on the surface, or (c) by plating the surface with nickel chromium or other suitable metals and forming fissures is that plating by acid etching, or by anodic or cathodic electrolysis. If the metallic surface inherently has the desired network of minute fissures or interstices, this first step is, of course not needed. An example of such a surface would be certain sintered or powdered metal materials or certain sprayed metal surfaces.

As a second step, the treated surface is preferably heated above at least 100° F, preferably at least 300° F, to enlarge the fissures or the like by thermal expansion of the metal. When the surface has been heated to the desired temperature, finely divided particles of perfluorocarbon resin, or metal or metal compound, preferably at room temperature or below are deposited on the heated surface and forced into the fissures or interstices in the surface such as by brushing on an aqueous dispersion of the material or by dusting with dry powder or air blasting with the dry powder to substantially fill the minute fissures.

As described herein the particles are at a temperature at least 80° F, advantageously at least 100° F and preferably at least 300° F below the temperature of the surface when they are applied to the surface.

While still hot, the coated surface may be rubbed, burnished, scrubbed or otherwise treated to further compact the particles in the enlarged fissures. It is then cooled to reduce the size of the fissures and to mechanically lock the expanded perfluorocarbon particles therein by an interference fit. The surface may also then be brushed, air blasted, etc. as desired to remove excess material and improve the surface appearance.

The product from the above treatment is then ready for the improved treatment of this invention, or it may first be used for its purpose such as stamping, drawing, forming, heat-sealing, molding, etc. and then subjected to the blasting operation and the second heating and particle deposition steps as described herein to lock in the fissures by interference fit an additional amount of the particles.

The portion of the total surface area comprising the entrapped particles may be from 5 to 75% and preferably is between about 10 to 60%. The surface is discontinuous in the sense that it is not completely covered by a layer of particles. The particle-filled fissures comprise something around 40% of the surface area. With perfluorocarbon resin particles the resulting surface generally feels extremely smooth, is much harder than surfaces completely coated with a layer of solid lubricant, and exhibits the combination of high lubricity, excellent anti-stick, good mechanical strength and high thermal conductivity. In addition, the solid lubricant particles appear to be protected from damage due to rubbing or scraping by this form of discontinuous surface.

For purposes of the present invention, the temperature differential between the particles and the surface of application should be at least 100° F, advantageously at least 150° F, and preferably at least 300° F. To achieve such differential, the particles can be applied at room temperature (about 60° F) or preferably below room temperature when applied to the metal surface. I prefer to cool the perfluorocarbon particles to about −100° F by means of dry ice or solid carbon dioxide to retard their expansion until compaction into the fissures is achieved.

Liquid nitrogen, going down to −400° F may also be employed to obtain the required temperature differential. Alternatively, the particles may be kept in the freezer of a refrigerator or in deep freeze apparatus.

Advantageously the piece to which the particles are to be applied should be heated in a furnace to about 50° F above the desired temperature to compensate for heat lost in transferring to working area and during the particle deposition process. Of course the effect of such heat losses depend somewhat on the size of the piece.

The surface to which the particles are to be applied may be treated in several ways to make it porous or provide a number of fissures or interstices into which the particles are fitted. As will be apparent to those skilled in the art, the surface may be electroetched by anodic or cathodic treatments in an acid or alkaline solution varied to suit the particular metal involved.

Alternatively, the surface may be treated with a suitable phosphate coating bath to form an integral phosphate coating on it, such coatings having a plurality of minute fissures in them.

The surface may be plated with electroless nickel, hard chromium, or other coatings known in the art and then such coating suitably treated to form a porous surface. Aluminum surfaces may be anodized or hard anodized.

The invention is illustrated by the following examples. These examples are intended merely for illustrative purposes and are not intended to limit in any way the scope of the invention or the manner in which it may be practiced. Parts and percentages are given by weight, unless specifically indicated otherwise.

EXAMPLE I

A multi-cavity matched die mold consisting of two steel plates for molding small rubber articles is cleaned and prepared for treatment using procedures well-known to those skilled in the art and which are commonly performed prior to zinc phosphating. The cleaned molding surfaces are phosphatized for 10 minutes at 195° F to produce a microcrystalline zinc phosphate coating on the metal surface.

The plates are then heated to 400° F in an electric oven to enlarge the minute fissures and submicron to about 10 microns polytetrafluoroethylene particles refrigerated to about −100° F are brushed evenly over the entire heated molding surface.

Promptly and as the heated plates begin to cool, the surface is brushed manually with a fiber brush and then burnished with a rotating Tampico end brush to further deposit and compact the particles only in the fissures.

The plates are then cooled to room temperature to contract the fissures and tightly lock the particles in the surface.

After this treatment, the release properties of the mold are greatly improved and greatly reduced quantities of release agent are needed. If necessary, the surface can thereafter be renewed daily and the mold may be kept in constant use for over six months.

The above procedure is repeated except that before being put into use the surface of the die mold is air blasted at 60 psi with an air stream containing polytetrafluoroethylene particles of the same size as originally used with average blasting time for fixed area being about 6 seconds. Then the original heating and particle deposition steps are repeated to lock in additional particles. When this die mold is put into use there is a still further improvement in release properties and it is possible to go two days and sometimes longer without surface renewal and be kept in constant use for longer than six months.

EXAMPLE II

Eight steel core members for use in molds for neoprene articles are plated with electroless nickel, e.g., sodium hypophosphite, chemical plated non-electrolytically by techniques well known to those skilled in the art as described in U.S. Pat. No. 2,532,283 to Brenner et al. The plating process produces a nickel layer of a thickness between 0.0002 and 0.003 inch after the plated surface was liquid-honed with 280 grit at an air pressure of 120 pounds. The plating resulting from this treatment has a fine network of minute fissures over the entire surface.

The plated cores are then heated to about 450° F in an electric oven to enlarge the minute fissures and a suspension of polytetrafluoroethylene particles in distilled water, is brushed evenly over the entire plated surface, leaving a residue of particles on the surface and in the enlarged fissures. As the core members begin to cool, the entire surface is burnished with a clean dry cotton cloth to further deposit and compact the particles in the fissures. The treated cores have exceptional release characteristics in the molding of neoprene articles and are kept in service for many months.

The above procedure is repeated except that prior to being placed in use the surface is blasted with a stream of water at about 60 psi and having suspended therein about 20 ounces per gallon of the same type of polytetrafluoroethylene particles. The average blasting time is about 25 seconds for a fixed area. The original heating and particle deposition steps are repeated to lock additional particles into the fissures. When these core members are used in the molding of neoprene articles the release characteristics are even much more improved and are kept in service many months more than previously.

EXAMPLE III

Two large plates of the type described above in Example I are cleaned and hard-chrome plated to a thickness of about 0.002 inch to 0.003 inch and polished if desired. The chrome surface is then treated to provide a fine network of minute fissures or interstices by treatment in an acidic bath formulation that creates suitably sized and shaped fissures. A suitable bath for this purpose is described in Example I of U.S. Pat. No. 3,701,698.

The surface is rinsed and neutralized in a mild alkaline solution (such as a 0.2% aqueous sodium bicarbonate solution) and wiped dry with clean absorbent material. After drying, the plates are heated in an electric furnace to about 400° F to enlarge the fissures by expansion.

After the plates are removed from the oven, the fissured areas are treated in small increments by depositing finely divided particles of polytetrafluoroethylene of about 10 micron size which have been previously treated by refrigeration to about −100° F. Deposition and entry of the chilled particles into the fissures is effected by use of a moving fiber brush or felt tool which works the particles into the enlarged fissures before the particles become expanded in size by the heat of the plated surface. The plates are then allowed to cool to room temperature thereby decreasing the fissure size to lock the expanded particles mechanically therein.

The above procedure is repeated with two similar steel plates except that these two plates are further treated after the particles have been locked in by blasting their surfaces with an air stream carrying an aqueous suspension of about 20 ounces of polytetrafluoroethylene of about 10 micron size per gallon of aqueous medium, the air stream being delivered at about 60 psi and the blasting time being about 6 seconds for fixed area. The blast is effected through a carbide nozzle having an opening 5/16 inches in diameter and having the aqueous suspension fed to the air stream through a venturi. The plates are immediately thereafter subjected to a repetition of the original heating and particle deposition steps to lock in additional particles by interference fit. These two plates show at least double the life of the first two plates when subjected to a molding operation.

EXAMPLE IV

The procedure of Example III is repeated using, instead of the steel plates, dies to be used in a stamping operation for the manufacture of automobile component parts. With dies treated as in the first part of Example III, about 160,000 stampings are made before the die surface has to be retreated. However with dies treated as in the latter part of Example III, where additional particles are locked in by the process of this invention, 260,000 to 300,000 stampings are made before the die surface has to be retreated.

EXAMPLE V

The procedure of Example III is repeated with similar results with the particles of polytetrofluoroethylene replaced with a 50—50 mixture of particles of polytetrafluoroethylene and of polymonochlorotrifluoroethylene.

EXAMPLE VI

The second procedure of Example III is repeated wherein a blasting operation is performed after the particles have been deposited into the surface pores of the heated plates except that after the particles have been deposited in the pores the blasting stream is applied directly without having the plates stand until they have reached room temperature. While the plates have cooled somewhat during the deposition and brushing operation the temperature is still well above room temperature. Nevertheless the immediate application of the blasting stream effects a rapid cooling of the surface so that results similar to those in Example III are obtained. In this case the blasting stream is obtained from a reservoir in which the temperature is approximately room temperature but upon release of the pressure under which the blasting stream is directed the temperature is lowered.

In addition to the particles shown in the above examples other particles that may be used in a similar manner to effect improvement in the ultimate product include: polymonochlorotrifluoroethylene, copolymer of tetrafluoroethylene and monochlorotrifluoroethylene (50—50), copolymer of tetrafluoroethylene and hexafluoropropylene, polyhexafluoropropylene, graphite, titanium, antimony, barium oxide, molybdenum disulfide and barium carbide.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:
1. In the process for preparing a metallic surface having pores in which particles are embedded therein which comprises:
   a. heating a porous metallic surface to at least 100° F and not more than 650° F to enlarge the pores thereof, said pores initially having an average width not greater than 100 microns;
   b. promptly thereafter depositing finely divided particles having an average size no greater than 50 microns onto said heated surface and working said particles into said pores, said particles being at a temperature at least 100° F below the temperature of said heated surface and being selected from the class consisting of perfluorocarbon polymers, elemental metals, metal oxides, metal nitrides, metal carbides and metal disulfides; and
   c. permitting said surface and particles to reach room temperature thereby to lock said particles into said pores;
the improvement comprising:
   d. subjecting a surface produced according to steps (a), (b) and (c) to a fluid stream having finely divided solid particles suspended therein at a pressure of 30-120 psi for a sufficient period to compact the embedded particles, said suspended particles having an average size no greater than 50 microns;
   e. thereafter heating said surface to a temperature of at least 100° F.
   f. promptly thereafter depositing additional finely divided particles similar to those already embedded in said pores onto said heated surface and working said particles into said pores, said particles being at a temperature at least 100° F below the temperature of said heated surface; and
   g. permitting said surface and particles to reach temperature equilibrium, thereby to lock said additional particles into said pores.

2. The process of claim 1 in which both the deposited and the suspended compacting particles are perfluorocarbon polymer particles.

3. The process of claim 1 in which both the deposited and the suspended compacting particles are polytetrafluoroethylene particles.

4. The process of claim 3 in which said porous surface is hard chromium.

5. The process of claim 1 in which said fluid stream is an air stream having the compacting particles suspended thereby.

6. The process of claim 1 in which said fluid stream is an air stream carrying an aqueous suspension of the compacting particles.

7. The process of claim 3 in which said fluid stream is an air stream carrying an aqueous suspension of said compacting particles.

8. The process of claim 7 in which said air pressure is 40-80 psi.

9. The process of claim 1 in which said surface is heated to a temperature of at least 150° F and the temperature differential between that of the surface and that of the deposited particles is at least 300° F.

10. The process of claim 9 in which both the deposited and the suspended compacting particles are perfluorocarbon polymer particles.

11. The process of claim 9 in which both the deposited and the suspended compacting particles are polytetrafluoroethylene particles.

12. The process of claim 11 in which said porous surface is hard chromium.

13. The process of claim 11 in which said fluid stream is an air stream carrying an aqueous suspension of said compacting particles.

14. The process of claim 13 in which said compacting particles have an average size of 0.05-50 microns.

15. The process of claim 14 in which said stream is applied at a pressure of 40-80 psi.

16. In the process for preparing a metallic surface having pores in which particles are embedded therein which comprises:
   a. heating a porous metallic surface to at least 100° F and not more than 650° F to enlarge the pores thereof, said pores having an average width not greater than 100 microns;
   b. promptly thereafter depositing finely divided particles having an average size no greater than 50 microns onto said heated surface and working said particles into said pores, said particles being at a temperature at least 100° below the temperature of said heated surface and being selected from the class consisting of perfluorocarbon polymers, elemental metals, metal oxides, metal nitrides, metal carbides and metal disulfides, whereby said metallic surface after said depositing is well above room temperature;

the improvement comprising:
   c. applying to a surface produced according to steps (a) and (b) a fluid stream, said fluid stream having a temperature equal to or below room temperature, a pressure of 30-120 psi, and having suspended therein finely divided particles of an average size no greater than 50 microns, said stream being applied for a sufficient period to compact the embedded particles and cool the said surface so that the surface and particles reach a temperature equal to or below room temperature whereby the said embedded particles are locked into the said pores;
   d. thereafter heating said surface to a temperature of at least 100° F.
   e. promptly thereafter depositing additional finely divided particles similar to those already embedded in said pores onto said heated surface and working said particles into said pores, said particles being at a temperature at least 100° F below the temperature of said heated surface; and
   f. permitting said surface and particles to reach temperature equilibrium, thereby to lock said additional particles into said pores.

* * * * *